(12) United States Patent
Diamond et al.

(10) Patent No.: US 11,149,656 B1
(45) Date of Patent: Oct. 19, 2021

(54) ENGINE THROTTLE BODY HYDROCARBON EMISSIONS REDUCTION SYSTEM

(71) Applicant: FORD GLOBAL TECHNOLOGIES, LLC, Dearborn, MI (US)

(72) Inventors: Brendan F. Diamond, Grosse Pointe, MI (US); Keith Weston, Canton, MI (US); Brent Alan Hall, Grand Blanc, MI (US); Brandon Roberts, Clawson, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/114,847

(22) Filed: Dec. 8, 2020

(51) Int. Cl.
| *F02D 9/10* | (2006.01) |
| *H02K 37/24* | (2006.01) |
| *H02K 7/116* | (2006.01) |
| *F02D 41/00* | (2006.01) |

(52) U.S. Cl.
CPC ........... *F02D 9/1035* (2013.01); *F02D 9/101* (2013.01); *F02D 9/102* (2013.01); *F02D 9/1005* (2013.01); *F02D 9/1015* (2013.01); *F02D 41/0002* (2013.01); *H02K 7/116* (2013.01); *H02K 37/24* (2013.01)

(58) Field of Classification Search
CPC .... F02D 9/1035; F02D 9/1005; F02D 9/1015; F02D 9/101; F02D 9/102; F02D 41/0002; H02K 7/116; H02K 37/24
USPC ....................................................... 123/337
See application file for complete search history.

(56) References Cited

U.S. PATENT DOCUMENTS

| 4,538,570 A | | 9/1985 | Lunt | |
| 5,992,377 A | * | 11/1999 | Dall'Osso | F02D 9/104 |
| | | | | 123/337 |
| 6,234,208 B1 | * | 5/2001 | Magdelyns | F02D 9/101 |
| | | | | 123/337 |
| 7,543,563 B2 | | 6/2009 | Dunn | |
| 2008/0029060 A1 | * | 2/2008 | Ikeda | F16K 1/221 |
| | | | | 123/337 |
| 2008/0072873 A1 | | 3/2008 | Kuhnel et al. | |
| 2009/0020099 A1 | * | 1/2009 | Bessho | F02D 9/1045 |
| | | | | 123/337 |

(Continued)

FOREIGN PATENT DOCUMENTS

| JP | 60036763 A | * | 2/1985 | ............. F02D 11/10 |
| JP | 02055872 A | * | 2/1990 | |
| JP | 4267561 B2 | | 2/2009 | |

OTHER PUBLICATIONS

JP255872A (Ishida)(Feb. 26, 1990)(Machine translation) Retrieved from Dialog on Apr. 28, 2021. (Year: 1990).*

*Primary Examiner* — Mahmoud Gimie
(74) *Attorney, Agent, or Firm* — Geoffrey Brumbaugh; Brooks Kushman P.C.

(57) ABSTRACT

A throttle body for an engine includes a throttle body housing, a throttle body plate supported by and rotatable within the throttle body housing, and a tab carried by the throttle body housing and movable between a first position in which the tab is in direct contact with the throttle body plate to prevent rotation of the throttle body plate and maintain the throttle body plate in a closed position, and a second position in which the tab is not in direct contact with the throttle body plate to permit rotation of the throttle body plate.

20 Claims, 5 Drawing Sheets

(56) References Cited

U.S. PATENT DOCUMENTS

| | | | |
|---|---|---|---|
| 2010/0237269 A1* | 9/2010 | Furukawa | F02D 9/1025 251/318 |
| 2014/0116372 A1* | 5/2014 | Nishimura | F02D 9/1035 123/184.46 |
| 2019/0186446 A1* | 6/2019 | Zhang | F02M 35/10229 |

* cited by examiner

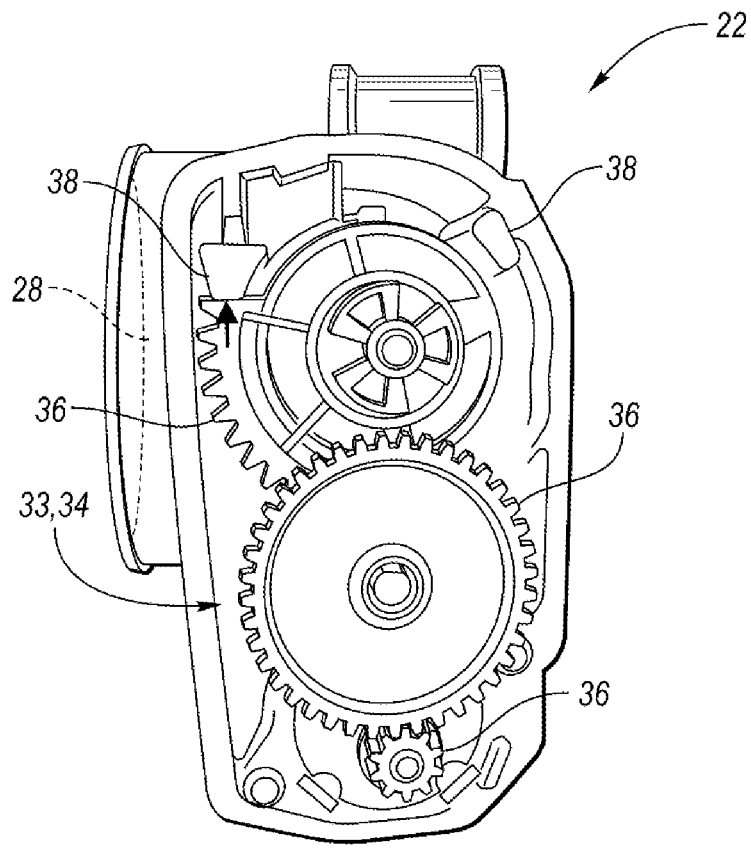
FIG. 3
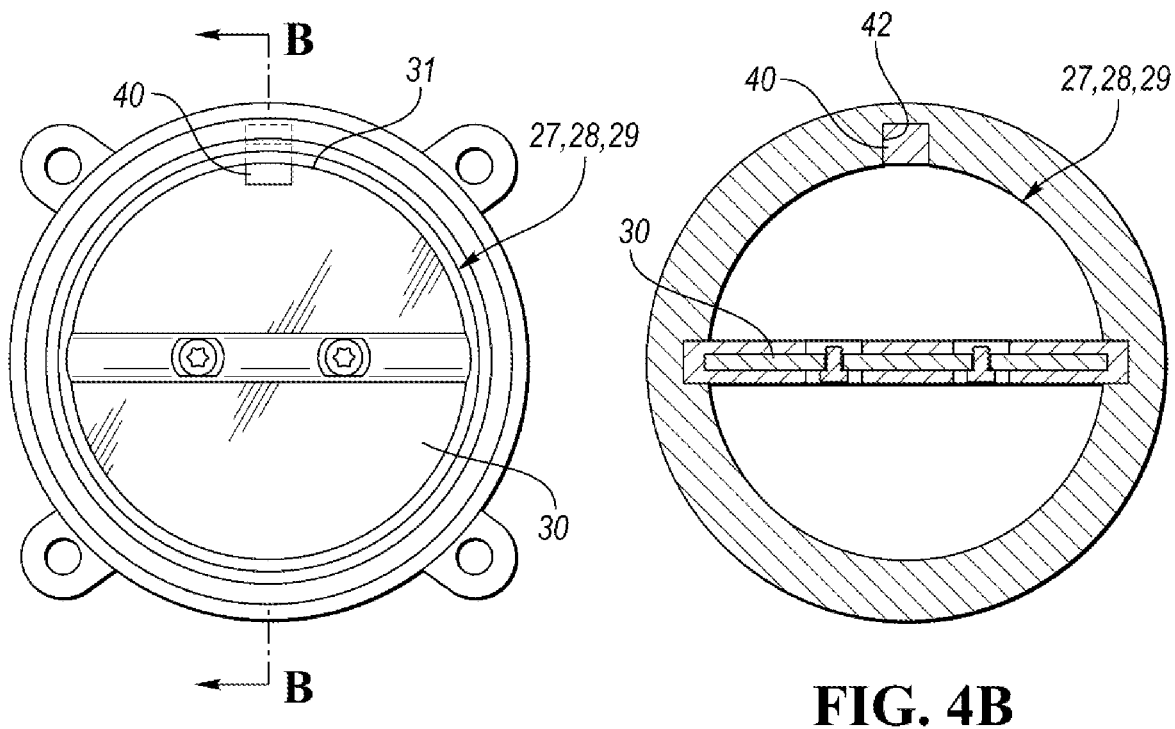
FIG. 4A  FIG. 4B

ENGINE THROTTLE BODY HYDROCARBON EMISSIONS REDUCTION SYSTEM

TECHNICAL FIELD

The disclosure relates to mechanical devices, associated with a throttle body of an engine, configured to reduce evaporative hydrocarbon (HC) emissions of a vehicle engine.

BACKGROUND

Reduction of tailpipe emissions is a challenging goal in the automotive industry. As the acceptable values for tailpipe emissions continue to decrease, technologies must continually improve to meet the standards. Many efforts have been focused on reduction of HC and NOx evaporative emissions. The traditional approaches to reducing the evaporative emissions include development of various catalysts and HC traps. But despite various efforts, passing the ever-more-stringent evaporative emissions tests remains to be challenging. Additionally, many of the design and catalyst solutions are relatively expensive.

SUMMARY

In at least one embodiment, a throttle body for an engine is disclosed. The throttle body includes a throttle body housing, a throttle body plate supported by and rotatable within the throttle body housing, and a tab carried by the throttle body housing. The tab may be movable between (i) a first position in which the tab is in direct contact with the throttle body plate to prevent rotation of the throttle body plate and maintain the throttle body plate in a closed position and (ii) a second position in which the tab is not in direct contact with the throttle body plate to permit rotation of the throttle body plate. The tab may be in the first position when the engine is off and in the second position when the engine is on. The throttle body plate may be configured to seal against the throttle body housing in the closed position. The tab may be configured to retract into a wall of the throttle body housing when in the second position and to protrude from the wall when in the first position. The throttle body may also include one or more additional tabs, each having the first and second position. The tab may be attached to a screw. The throttle body may also include a sealing compound on at least a portion of the throttle body housing, the throttle body plate, or both. The throttle body may further include one or more controllers programmed to command movement of the tab.

In another embodiment, a throttle body for an engine is disclosed. The throttle body includes a throttle body housing having a wall defining a bore; a throttle body plate supported by the wall and rotatable within the bore; and a rotary threaded sleeve engaged with the wall around a circumference of the bore. The rotary threaded sleeve may include a tab configured to move axially within the bore, toward the throttle body plate to engage the throttle body plate responsive to rotation of the rotary threaded sleeve in a first direction and axially away from the throttle body plate to disengage the throttle body plate responsive to rotation of the rotary threaded sleeve in a second direction opposite to the first direction. The throttle body plate may be configured to seal against the wall. The tab may be located at a first end of the rotary threaded sleeve. The tab may be configured to move in the first direction when the engine is shut off and in the second direction when the engine is turned on. The throttle body may also include one or more controllers programmed to command movement of the tab. The rotary threaded sleeve may include a plurality of threads gradually increasing in the first direction. The throttle body may also include a sealing compound on at least a portion of the throttle body housing, the throttle body plate, or both.

In yet another embodiment, a method for controlling an engine is disclosed. The method includes commanding movement of a tab, carried by a throttle body housing, within a bore defined by the throttle body housing to directly engage a throttle body plate to prevent rotation of the throttle body plate and establish a seal between the throttle body plate and the throttle body housing, in response to the engine being shut off. The method also includes commanding movement of the tab within the bore to disengage the throttle body plate to permit rotation of the throttle body plate within the bore, in response to the engine being turned on. The commanding movement of the tab may include actuating a stepper motor to rotate a rotatable threaded sleeve attached to the tab. The method may also include rotating the threaded sleeve away from the throttle body plate until a gap is formed between the tab and the throttle body plate, the gap being large enough to permit the rotation of the throttle body plate within the bore. The commanding movement of the tab may include actuating a stepper motor to retract the tab into the throttle body housing to disengage the throttle body plate. The commanding movement of the tab may include actuating a stepper motor to release the tab from the throttle body housing to directly engage the throttle body plate.

BRIEF DESCRIPTION OF THE DRAWINGS

FIG. 3 shows a side view of the throttle body shown in FIGS. 1 and 2 including a gear system;

FIG. 4A depicts a front view of a throttle body according to one or more embodiments having a tab protruding from the throttle body housing in direct contact with the throttle body plate, the plate being in a closed position;

FIG. 4B shows a cross-sectional view of the throttle body of FIG. 4D along lines A-A having the tab recessed in the throttle body housing, the plate being in an open position;

DETAILED DESCRIPTION

Figure 1:
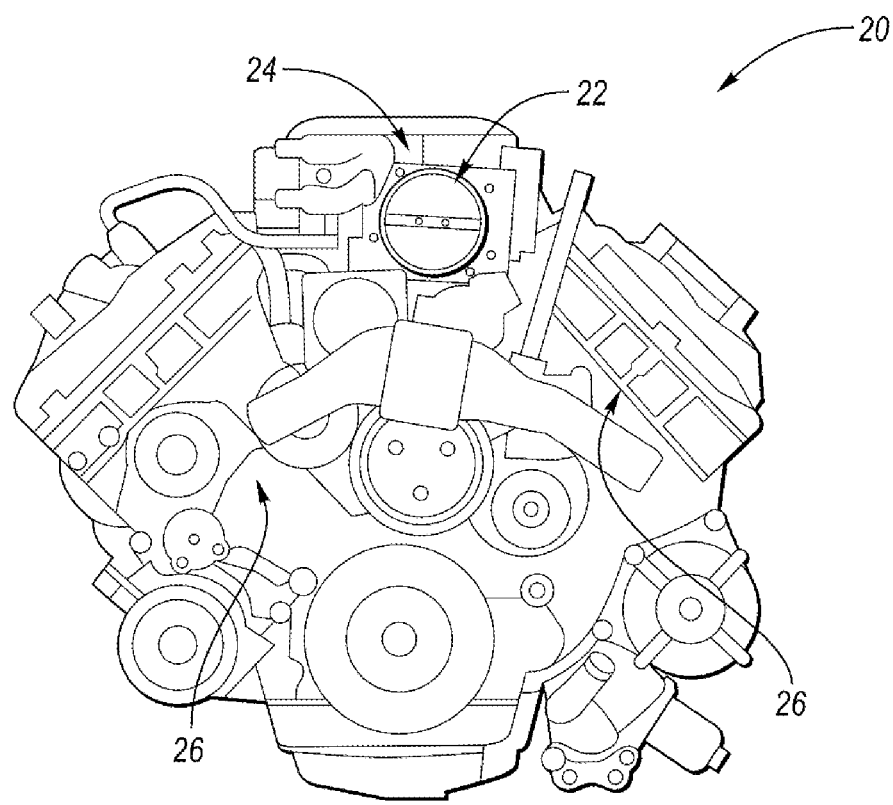
FIG. 1 depicts a front perspective view of a non-limiting example of an engine including a non-limiting example of a throttle body.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "substantially," "generally," or "about" means that the amount or value in question may be the specific value designated or some other value in its neighborhood. Generally, the term "about" denoting a certain value is intended to denote a range within +/−5% of the value. As one example, the phrase "about 100" denotes a range of 100+/−5, i.e. the range from 95 to 105. Generally, when the term "about" is used, it can be expected that similar results or effects according to the disclosure can be obtained within a range of +/−5% of the indicated value. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4, . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits. Any two numbers, of a set of numbers, may form an integer range. For example, if the disclosed numbers are 1, 2, 3, 4, 5, the range the numbers cover may be 1 to 5, 1 to 3, 2 to 4, 3 to 4, among other options.

As used herein, the term "and/or" means that either all or only one of the elements of said group may be present. For example, "A and/or B" means "only A, or only B, or both A and B". In the case of "only A", the term also covers the possibility that B is absent, i.e. "only A, but not B".

It is also to be understood that this disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" as a subset.

In the interest of preserving the environment, evaporative emission standards have become increasingly strict. As a result, various methods and designs have been developed to minimize evaporative HC and $NO_x$ emissions. Among the traditional solutions are HC traps such as flow through traps and flow by traps. Neither are an ideal solution due to their relatively high cost as a result of relatively expensive materials incorporated in the traps. Additionally, the traps add complexity and weight to the exhaust system.

Moreover, even with the HC traps in place, it has been a challenge to meet strict evaporative emissions standards such as LEV III Regulatory requirements. A vehicle has to meet the emissions tests before it can be sold. Hence, there is a heightened need to provide an effective, yet economical, solution to the problem of passing the evaporative emissions tests and overall improvement of HC emissions management in a vehicle.

In one or more embodiments, a fuel injection engine having a throttle body mechanism solving one or more problems discussed above is disclosed. The engine may be any type of fuel injection engine. The engine may be straight, inline, V, or flat. The engine may be a twin-cylinder, three-cylinder, four-cylinder, five-cylinder, six-cylinder, or eight-cylinder engine. The engine may include one, more than one, at least one, or a plurality of throttle bodies.

A non-limiting example of a fuel injection engine 20 having a throttle body 22 is shown in FIG. 1. As can be seen, the engine includes an intake manifold 24 with the throttle body 22 arranged between the cylinder heads 26.

Figure 2:
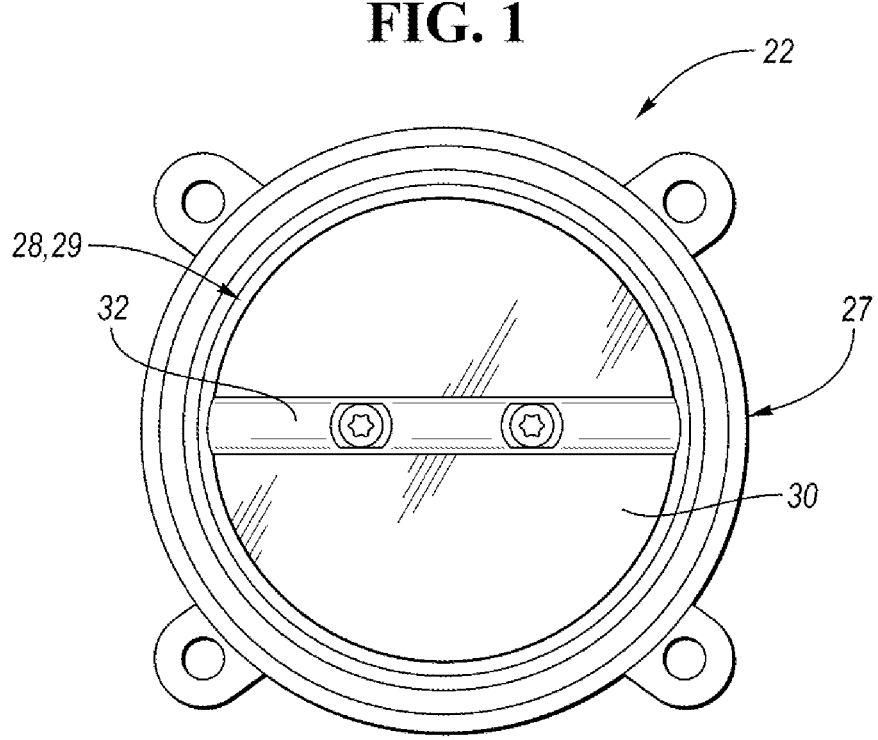
FIG. 2 depicts a front view of the throttle body shown in FIG. 1.

The throttle body 22 is a part of the air intake 24 system controlling the amount of air flowing into the engine 20. The throttle body 22 may be located between an air filter box (not shown) and the intake manifold 24. The throttle body 22 typically has various parts including a housing 27 having a wall 29 defining a bore 28. The throttle body 22 further includes a throttle body plate 30 on a shaft 32, shown in FIG. 2. The throttle body plate 30 may be supported by the wall 29 and be rotatable within the bore 28. The throttle body plate or blade 30 may be a valve such as a butterfly valve. The throttle plate 30 may be opened, closed, and put in a default position electronically, mechanically, or both.

The housing 27 also includes a plate opening/closing system 33 arranged to open and close the throttle plate 30 in response to the vehicle's accelerator pedal position. Various types of the opening/closing systems or mechanisms 33 may be employed. In a non-limiting example, the opening/closing system 33 may include a throttle body gear system 34 located to the side of the bore 28, housing 27, or both, as is depicted in FIG. 3. The gear system 34 may include two or more gears 36 designed to cooperatively turn. Via the cooperative turning motion, the gears actuate opening and closing of the throttle plate 30. The amount of gears 36 may vary and be, for example, 2, 3, 4, or more. The gears 36 may have the same or different size, thickness, arrangement, material, the like, or a combination thereof.

The opening/closing system 33 may include alternative and/or additional devices such as an actuator of the gear system, throttle linkages, levers, springs, electric actuator, the like, or a combination thereof. The opening/closing system 33 may include one or more notches, protrusions, grooves, or projections 38 configured to limit movement of the gears 36, levers, linkages, etc. within the opening/closing system 33.

The throttle body 22 may include or be connected to one or more sensors (not depicted). The one or more sensors may include a sensor which outputs a signal proportional to the current pedal position and is configured to send the signal to the engine control unit (ECU), a mass air flow sensor, which measures the amount of air passing through the throttle body and communicates with the ECU, other sensor(s), or a combination thereof.

The throttle body 22 may be connected to the vehicle's accelerator pedal (not depicted) with linkage(s), flexible cable, and/or other mechanisms. When the accelerator pedal is depressed, when the engine is turned on, the linkage(s) and/or cable may move and, directly or indirectly via another mechanism such as the gear system, set the throttle plate 30 into its open or default position within the throttle body 22. Alternatively, the throttle body 22 may be an electronic throttle body (ETB) controlled via a controller such as an electronic throttle control (ETC) system. When a user presses the vehicle's accelerator pedal, the ETC commands the desired throttle position. The opening of the throttle plate 30 allows influx of air into the intake manifold.

The default position relates to a position in which the plate 30 is in a vertical position, but no seal between the plate 30 and the housing 40 is formed. The default position may be a position of the throttle plate 30 having a default angle of various values. In a non-limiting example, the default position of the throttle plate 30 in the bore 28 may have an angle of about 10 to 40, 13 to 30, or 15 to 25 degrees. Other angles are anticipated for the default position.

The open position relates to one or more positions of the plate 30 in which the plate 30 is in a vertical or horizontal position. The open position may relate to one or more positions including a maximum achievable rotation of the plate 30 within the bore 28, a minimum rotation of the plate 30 within the bore 28 allowing influx of air between the intake manifold and air filter, any position in between, or their combination.

Typically, when the accelerator pedal is not depressed, such as when the engine is idling or shut off, the throttle plate 30 is in its default position. But in its default position, the plate 30 may move and/or the closure may not be air-tight such that a certain amount of fluid may pass through the throttle body 22 even when the accelerator pedal is not depressed. For example, when the engine is shut off, the power may be removed from the ETB throttle and the plate 30 may open to its default position. It has been indicated that HCs may then leak into the intake manifold 24. A throttle plate 30 in its default position and/or an improperly or imperfectly closed throttle plate 30 may enable leakage of the HCs from the intake manifold 24 into the environment when the engine is shut off. This leakage may be detected during evaporative emissions tests.

The throttle body 22 disclosed herein thus includes one or more mechanisms configured to provide or form a seal between the throttle plate 30 and the throttle body housing 27 when the engine is shut off. The one or more mechanisms may have one or more variations. The one or more variations may be combined. In one or more embodiments, on shut off, the one or more mechanisms may be activated and the throttle plate 30 restrained in its closed position.

In at least one embodiment, the housing 27 is provided with a tab 40, as is shown in FIGS. 4A-D. The tab 40 may be a protrusion, knob, nub, or projection. The tab 40 may be located in and/or carried by the housing 27, the bore 28, the wall 29, or a combination thereof. The tab's location in the housing 27 may be anywhere around the circumference of the bore 28. The tab 40 may be located upstream from the throttle plate 30. The plate 30 may be located between the tab 40 and the intake manifold.

The tab 40 may be a protruding tab such that the tab 40 has at least two different positions. In a first position, shown in FIGS. 4A and 4C, the tab 40 may be at least partially of fully protruding from the bore 28 into the space immediately adjacent to, in front of, the plate 30. More specifically, the tab 40 may protrude in front of the edge portion 31 of the plate 30. In the first position, the tab 40 forces or restrains the plate 30 to remain in its closed position and prevents the plate's 30 movement to an open position. In the first position, the tab 40 is in direct contact with the plate 30 such as with the edge 31 of the plate 30. In the first position, the tab 40 is in the direct contact with the plate 30 to prevent rotation of the plate 30 and maintain the plate 30 in the closed position.

Figure 4C:
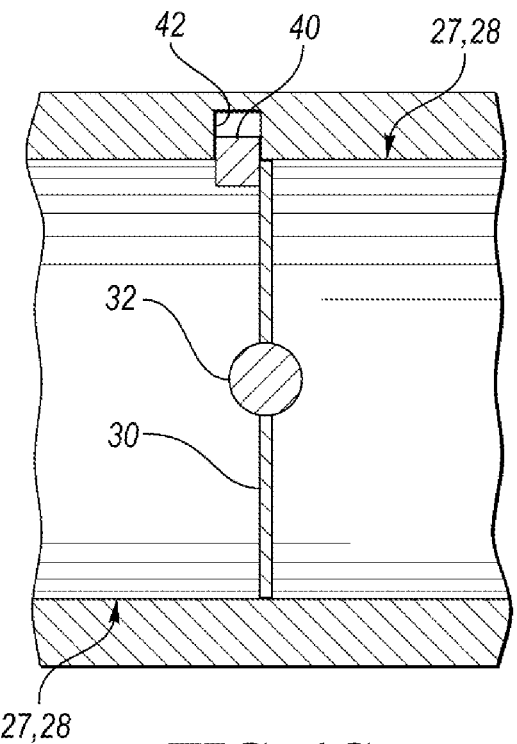
FIG. 4C shows a schematic cross-sectional view of the throttle body of FIG. 4A along lines B-B showing the protruding tab in direct contact with the plate, the plate being in the closed position.
Figure 4D:
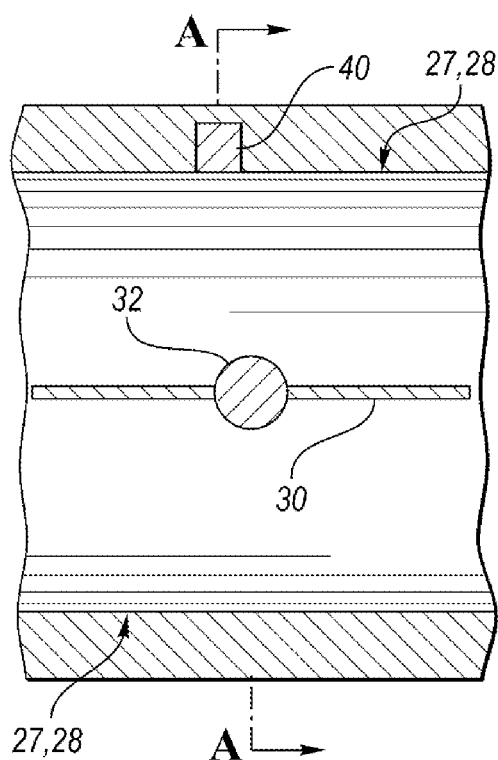
FIG. 4D shows a schematic cross-sectional view of the throttle body of FIG. 4A along lines B-B showing the tab retracted into the housing and the plate being in the open position.
Figure 4E:
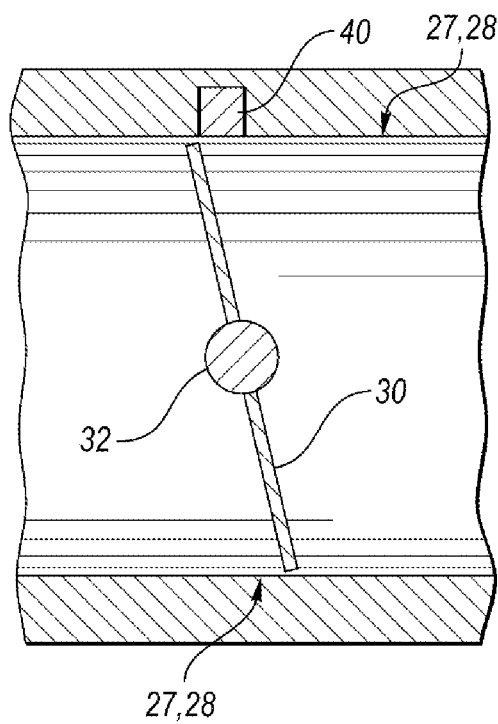
FIG. 4E shows a schematic cross-sectional view of the throttle body of FIG. 4A along lines B-B showing the tab retracted into the housing and the plate being in an example default position.

In the second position, shown in FIGS. 4B, 4D, and 4E, the tab 40 may be fully retracted, recessed, or hidden in the housing 27, for example in a notch 42 located in the wall 29. In the second position, the tab 40 is not preventing movement or rotation of the plate 30 such that the plate 30 may move freely into the open position and allow influx of air into the intake manifold while the engine is turned on. The open position may relate to a fully opened position, depicted in FIGS. 4B and 4D, or a partially opened position, depicted in FIG. 4E. The partially opened position may be a default position of the plate 30. In the second position, the tab 40 is not in direct contact with the plate 30 to permit rotation of the plate 30 within the bore 28.

The tab 40 may be in the second position, retracted into the notch 42, when the engine is turned on. When the engine is turned off, the tab 40 may be in the first position, protruding from the notch 42. The tab 40 may be actuated using a variety of mechanisms including, for example, a throttle blade position sensor, relay, current and electromagnetic coil, electric stepper motor with a screw allowing vertical transition of the tab into the first position, the like, or a combination thereof. For example, a position of the throttle plate 30 may be determined from a stepper motor position. When the engine is shut off, the stepper motor may actuate the tab 40 to go into the first position, protruding from the notch 42, to keep the plate 30 in its closed position, once the desired plate position is reached. When the engine begins to turn on, the stepper motor may actuate pulling or retraction of the tab 40 into the notch 42, allowing the plate 30 to transition into its open or default state.

The housing 27 may be provided with more than one tab 40. The housing 27 may, for example, include two, three, four, or more tabs 40. The tabs 40 may have the same or different dimensions, configurations, materials, the like, or a combination thereof. The tabs 40 may be spaced around the bore 27 in a regular pattern or in an irregular manner.

Figure 5A:
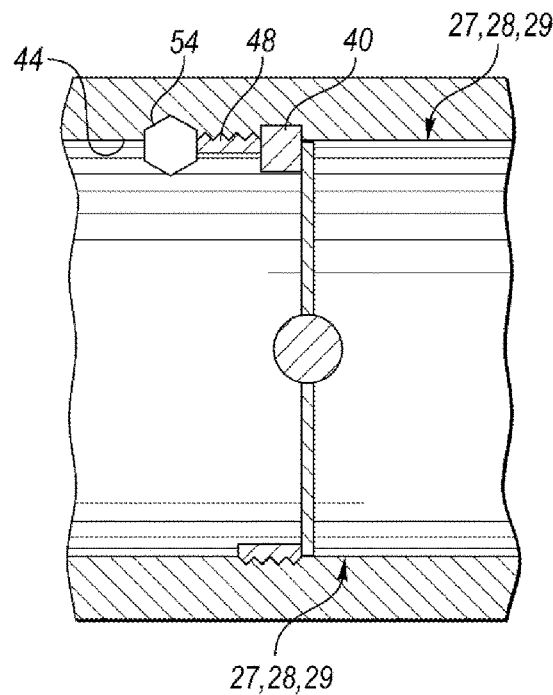
FIG. 5A shows a schematic cross-sectional view of a throttle body according to one or more embodiments showing a rotary threaded sleeve with a tab in direct contact with the plate, the plate being in the closed position.
Figure 5B:
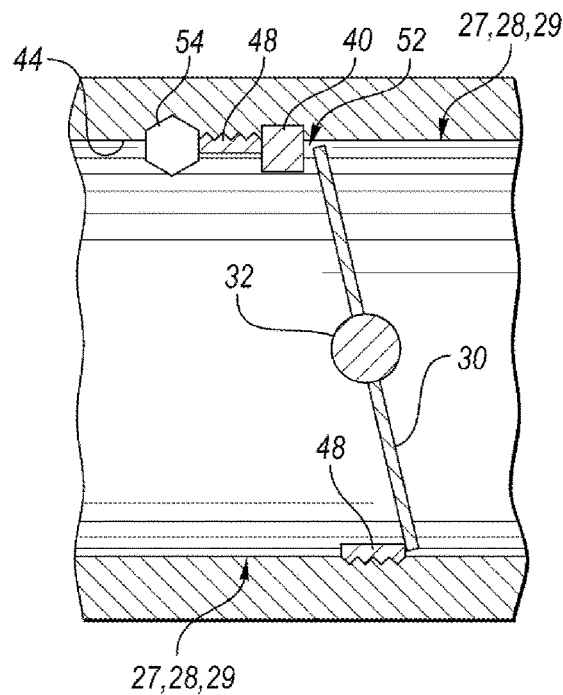
FIG. 5B shows a schematic cross-sectional view of the throttle of FIG. 5A showing the rotary threaded sleeve with the tab forming a gap between the tab and the plate, the plate being in the example default/open position.

In an alternative embodiment, depicted in FIGS. 5A and 5B, the tab 40 may prevent the plate 30 from moving into an open position in a different manner than was described above. Instead of the tab 40 protruding from the housing 27 vertically, the tab 40 moves axially, within the bore 28, along the edge 44 of the bore 28. This may be accomplished, for example, by a threaded element 48. The threaded element 48 may be engaged with the wall 29 around a circumference of the bore 28. The threaded element or feature 48 may be a rotary sleeve. The rotary sleeve 48 may be configured to move the tab 40 axially in two directions. In the first direction, the tab 40 may move towards the plate 30 to engage the plate 30. In the second direction, the tab 40 may move away from the plate 30 to disengage the plate 30. The first direction is the opposite of the second direction.

The rotation of the sleeve 48 towards, or in the direction of, the plate 30, may result in formation of a seal of the plate 30 against the wall 29 such that the plate's rotation and transition into the open position is being prevented and the plate's closed position is maintained. Rotation of the rotary threaded sleeve 48 in the first direction is commanded when the engine is off. The rotation of the rotary threaded sleeve 48 in the first direction, resulting in direct engagement of the tab 40 with the sleeve 30, is schematically shown in FIG. 5A.

When the engine is on, the rotary sleeve 48 may be rotated in the second direction away from the plate 30, thus forming a gap 52 between the tab 40 and the plate 30. The gap 52 is large enough to disengage the tab 40 from the plate 30 and enable the plate 30 to move or transition into its open or default position. Actuation of the tab 40 and/or rotary sleeve 48 may be accomplished by any means discussed above. A non-limiting example schematically depicted in FIGS. 5A and 5B may be a stepper motor 54.

The threaded element 48 may have a number of threads sufficient to enable the tab 40 to block movement of the plate 30 when the engine is off and enable the tab 40 to move so far away from the plate 30 that the gap 52 may be formed when the engine is on. The number of threads may be such that it allows the plate 30 to move to its open, default, or second position. The number, size, dimensions (length, height, thickness) and configuration of the threads may vary. The threads may increase or decrease in at least one dimension in the direction towards the plate 30 such that more or less resistance is provided in the first or second position. The increase/decrease may be gradual.

The mechanisms described above create a seal between the throttle body plate 30 and the throttle body housing 27. The created closed housing-plate interface should be sufficient to create a gas tight seal preventing egress of any fluid from the intake manifold. To further enhance tightness of the seal, one or more alternative or additional features may be included. The features may include adjustment of surface contours of the wall 29 and/or the plate 30 to provide a tight seal, applying a sealing device or substance to a circumference of the plate 30 and/or to the edge of the wall 29, machining a lip or curb in the wall 29 against which the plate 30 may lie flat, or a combination thereof. The sealing device may be a gasket or skirt. The sealing substance may be, for example, rubber, synthetic rubber, elastomer such as fluoropolymer elastomer, the like, or their combination.

Figure 6A:
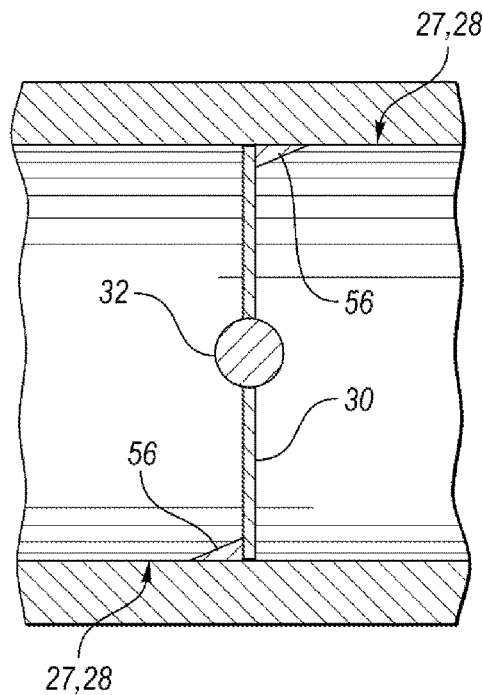
FIGS. 6A-6B show schematic cross-sectional views of a throttle body according to one or more embodiments showing the throttle body plate in the closed position and in direct contact with one and two notches, respectively, carried by the housing.
Figure 6B:
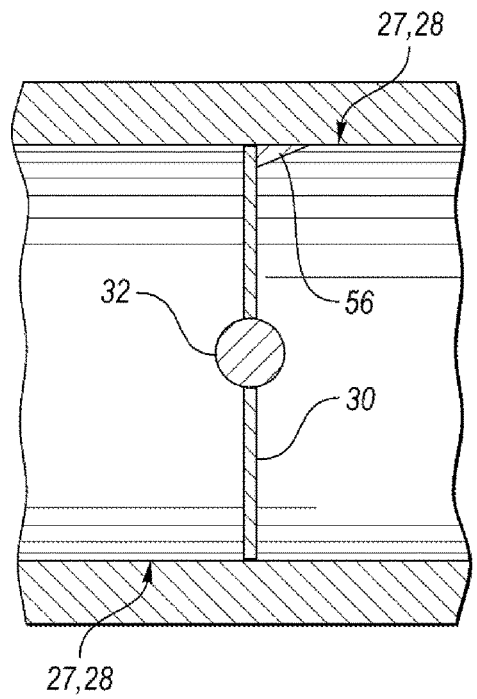
Figure 7A:
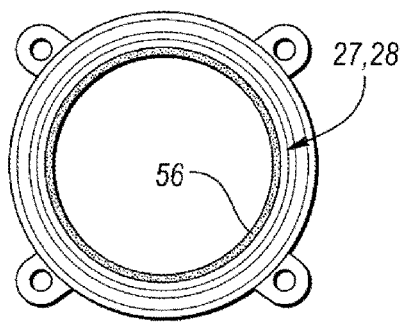
FIGS. 7A-7C show schematic front views of a non-limiting example of the throttle body housing having one or more sections of one or more sealing features along the circumference of the housing wall.
Figure 7B:
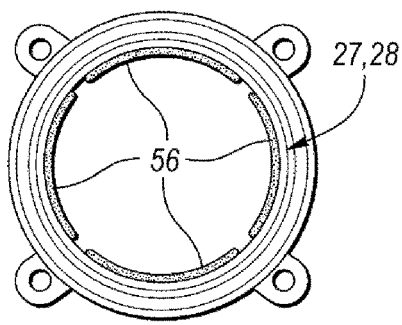
Figure 7C:
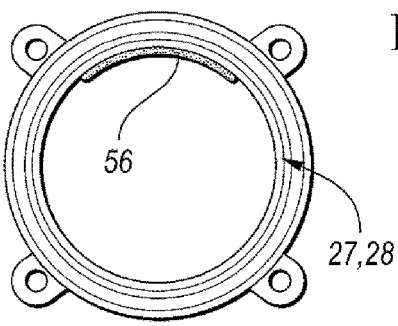

The surface contours may be adjusted by various techniques such as machining, drilling, casting, etc. The surface contours of the plate 30 or the housing 27 may be adjusted, for example, as is depicted in FIG. 6A or 6B. As can be seen in the schematic depictions of FIGS. 6A-FIG. 7C, the housing 27 may have a sealing feature 56 along the circumference of the housing 27. The sealing feature 56 may be a curb, raised edge, notch, border, barrier, ledge, lip, sill, bar, reef, mantle, step, or rim. The sealing feature 56 may have one or more portions such as a first, second, third, fourth, or additional portions. The sealing feature 56 may be continuous or discontinuous. The sealing feature 56 may be arranged along the entire circumference, as FIGS. 6A and 7A show, or at least a portion of the circumference, as FIGS. 6B, 7B, and 7C show. For example, the sealing feature 56 may be configured along one, two, three, four, or more portions of the circumference of the bore 28 and/or housing 27. Alternatively, the sealing feature 56 may be a sealing device or sealing substance as described above. The bore 28 may include a combination of the sealing features 56 described herein, for example a combination of a curb and a sealing substance.

The system disclosed herein may, in addition or alternatively, include one or more mechanisms associated with the throttle body gear system 34. For example, the housing 27 and/or the gear system 34 may include a gear tab 58, similar to the tab 40 described above. The gear tab 58 may be actuated as is described with reference to the tab 40 above, for example by a stepper motor 54, schematically depicted in FIGS. 8A and 8B. The gear tab 58 may have at least two positions. In the first position, the gear tab 58 is configured to lock at least one of the gears 36 in a position keeping the plate 30 in a closed position, forming a seal between the plate 30 and the housing 27. The gear tab 58 may be a protruding tab 58 such that the gear tab 58 releases or pulls out from the housing 27 in the first position. The protrusion may occur in an axial or radial direction to lock a gear 36 in a closed position through direct (actual gear) or transitive (connected gear) tab placement actuation.

Figure 8A:
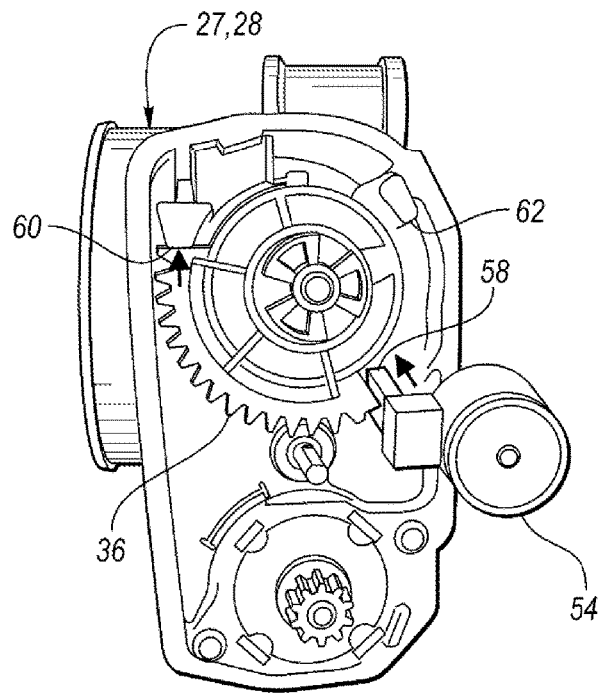
FIG. 8A shows a side view of the throttle body according to one or more embodiments with a gear tab directly engaging a gear system.

The gear tab 58 may be located adjacent to at least one gear 36. The gear tab 58 may be in direct contact with the at least one gear 36 in the first position. The gear 36 may rotate between a first notch 60 and a second notch 62. The location of the notches in FIG. 8A is a non-limiting example, and the notches may be placed in different locations than depicted. The tab 58 may be located anywhere in the path of the gear 36 between the first and second notches 60 and 62. The location of the gear 36 may be about halfway between the first and second notches 60 and 62. Alternatively, the tab 58 may be located about 1/16, 1/8, 1/10, 1/6, 1/5, 1/4, or 1/3 of the way from a first notch to the second notch or vice versa.

The gear tab 58 in the first or locking position is shown in FIG. 8A. As can be seen in FIG. 8A, the gear tab 58 is inserted into the path of the gear 36 between the notches 60 and 62, preventing the gear's further movement, which in turn locks the plate 30 in the closed position. In the first position, the gear tab 58 directly engages the gear 36.

Figure 8B:
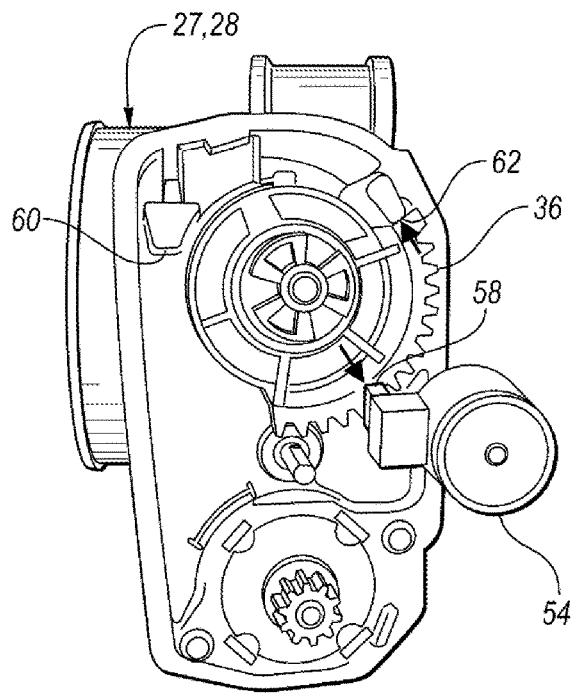
FIG. 8B depicts a side view of the throttle body of FIG. 8A with the gear tab retracted and disengaging the gear system.

FIG. 8B shows a second or non-locking position of the gear tab 58. In the second position, the gear tab 58 is pulled out of the gear's way. In the second position, the gear tab 58 is disengaged from the gear 36. In the second position, the gear tab 58 is retracted such that the tab 58 does not interfere with the movement of the gear 36, and the tab 58 does not contact the gear 36. In the second position, the gear tab 58 may retract into the housing 27. The second, non-locking position of the gear tab 54 corresponds to the fully or partially opened position of the plate 30, including the default position of the plate 30.

The mechanism disclosed herein may include one or more controls features to ensure that the throttle body plate 30 is not released from the closed position prematurely, that the throttle body 30 is released from the closed position in a timely manner, and/or to command the desired throttle position such as closed, open, default. For example, the mechanism may include one or more controllers (not depicted). The controllers may include ECU and/or one or more additional controllers. The one or more controllers have one or more processing components such as one or more microprocessor units (not depicted) which enable the controllers to process input data. The controllers may include the ETC controlling the ETB. The controller(s) may be programmed to change the position of the throttle body plate 30 based on the state of the engine. The controller(s) may be programmed to dynamically change the position of the plate 30. For example, when the engine is shut off, the ETC may command the ETB to activate the one or more mechanisms/devices described herein to restrain the plate 30 in its closed position. The power may be then removed form the ETB. When the engine is started, the ETC may command deactivation of the one or more mechanisms/devices, and thus deactivation of the closed position of the plate 30, and a start-up event and normal throttle command may resume.

The controller(s) may receive one or more inputs and based on the one or more inputs, the controller(s) may output a signal to actuate the one or more devices of the mechanism/system described above. The input data may be provided by one or more sensors (not depicted) of the system. The one or more sensors may send one or more input signals to the one or more controllers periodically, continuously, in real time, one time, at least one time, at predetermined times, in response to a specific action taken by a driver, the like, or a combination thereof. The sensors may send input signals at random or at predetermined intervals.

For example, the inputs may include one or more inputs confirming a true intent to start the vehicle. The one or more inputs may include sensing of the driver's door opening, inserting a driver's seat belt buckle in the buckle housing, increased weight on the driver's seat indicative of a driver sitting behind the wheel for a predetermined duration of time, actuation of the vehicle start button, input from vehicle interior cameras indicative of the driver being present in the vehicle and facing forward in the driver's seat, the like, or a combination thereof. The input data may include real time data.

In response to receiving one or more inputs, the one or more controllers may generate outputs commanding actuation of the one or more throttle body devices disclosed herein. The commanding may include sending a signal to an actuator such as a stepper motor to pull the tab 40 into the slot 42 or move the rotary sleeve 48 axially away from the plate 30.

In one or more embodiments, a method of preventing HC emissions leakage from the engine is disclosed. The method may include using one or more devices, mechanisms, or systems disclosed above. The method may include controlling a position of the throttle body plate 30 by one or more programmed controllers, sensors, tabs, sealing materials, recesses, threaded features, actuators, cables, linkages, or their combination, as described above. The method may include forming a closure and/or seal between the throttle body housing 27 and the throttle body plate 30 to prevent leakage, egress, or influx of gasses from the intake manifold to the environment via the throttle body 22 when the engine is turned off. The method may include trapping HCs in the intake manifold or supercharger of the engine while the engine is off by using the throttle body described herein. The method may include sucking the trapped HCs into the engine and reusing the trapped HCs in a next combustion cycle, during the engine start up.

The method may include steps for controlling an engine. The method may include controlling the engine in different states of the engine including engine shut off, engine start up, and engine being turned on. The method may include, by an ETC, commanding a mechanism/device disclosed herein via ETB. The method may include, by a controller, commanding movement of the tab 40, within the bore 28 to directly engage the plate 30 to prevent rotation of the plate 30 and establish a seal between the plate 30 and the housing 27 in response to the engine being shut off. The commanding movement of the tab 30 may include actuating a stepper motor or another actuator to rotate the rotatable threaded sleeve 48 attached to the tab 40 in the first or second direction. The method may include rotating the sleeve 48 towards the plate 30 until a direct contact between the tab 40 and the plate 30 is established. The method may include rotating the sleeve 48 away from the plate 30 until a gap 52 is formed between the tab 40 and the plate 30, the gap being large enough to permit the rotation of the plate 30 within the bore 28.

The commanding movement of the tab 40 may include actuating a stepper motor or another actuator to retract the tab 40 into the housing 27 to disengage the plate 30. The commanding movement of the tab 40 may include actuating a stepper motor or another actuator to release the tab 40 from the housing 27 to directly engage the plate 30.

The advantages of the present disclosure include a system and a method enabling compliance with evaporative emissions standards such as LEV III standards, ability to implement one or more mechanisms described herein in a variety of vehicle and engine types, introducing a solution having a low level of complexity, minimal hardware change, and/or minimal software change. An additional advantage may be that the disclosed mechanisms/systems/methods implement or utilize existing parts of the engine such as the throttle body, controllers, sensors, the like, or their combination. Another advantage may be reducing automatic idle speed (AIS) restriction, which may result in increased horsepower and engine performance.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A throttle body for an engine, comprising:
   a throttle body housing defining a bore;
   a throttle body plate supported by and rotatable within the throttle body housing; and
   a tab carried by the throttle body housing and movable between (i) a first position in which the tab protrudes into the bore adjacent to the throttle body plate and is in direct contact with the throttle body plate to prevent rotation of the throttle body plate and maintain the throttle body plate in a closed position and (ii) a second position in which the tab is not in direct contact with the throttle body plate to permit rotation of the throttle body plate.

2. The throttle body of claim 1, wherein the tab is in the first position when the engine is off and in the second position when the engine is on.

3. The throttle body of claim 1, wherein the throttle body plate is configured to seal against the throttle body housing in the closed position.

4. The throttle body of claim 1, wherein the tab is configured to retract into a wall of the throttle body housing when in the second position and wherein the tab is configured to protrude from the wall when in the first position.

5. The throttle body of claim 1 further comprising one or more additional tabs, each having the first and second position.

6. The throttle body of claim 1, wherein the tab is attached to a screw.

7. The throttle body of claim 1 further comprising a sealing compound on at least a portion of the throttle body housing, the throttle body plate, or both.

8. The throttle body of claim 1 further comprising one or more controllers programmed to command movement of the tab.

9. A throttle body for an engine comprising:
   a throttle body housing having a wall defining a bore;
   a throttle body plate supported by the wall and rotatable within the bore; and
   a rotary threaded sleeve engaged with the wall around a circumference of the bore, and including a tab configured to move axially, within the bore, toward the throttle body plate to engage the throttle body plate responsive to rotation of the rotary threaded sleeve in a first direction and axially away from the throttle body plate to disengage the throttle body plate responsive to rotation of the rotary threaded sleeve in a second direction opposite to the first direction.

10. The throttle body of claim 9, wherein the throttle body plate is configured to seal against the wall.

11. The throttle body of claim 9, wherein the tab is located at a first end of the rotary threaded sleeve.

12. The throttle body of claim 9, wherein the tab is configured to move in the first direction when the engine is shut off and in the second direction when the engine is turned on.

13. The throttle body of claim 9 further comprising one or more controllers programmed to command movement of the tab.

14. The throttle body of claim 9, wherein the rotary threaded sleeve includes a plurality of threads gradually increasing in the first direction.

15. The throttle body of claim 9 further comprising a sealing compound on at least a portion of the throttle body housing, the throttle body plate, or both.

16. A method for controlling an engine:
   responsive to the engine being shut off, commanding movement of a tab, carried by a throttle body housing, within a bore defined by the throttle body housing to directly engage a throttle body plate to prevent rotation of the throttle body plate and establish a seal between the throttle body plate and the throttle body housing by protruding into the bore adjacent to the throttle body plate, and
   responsive to the engine being turned on, commanding movement of the tab within the bore to disengage the throttle body plate to permit rotation of the throttle body plate within the bore.

17. The method of claim 16, wherein the commanding movement of the tab includes actuating a stepper motor to rotate a rotatable threaded sleeve attached to the tab.

18. The method of claim 17, further including rotating the threaded sleeve away from the throttle body plate until a gap is formed between the tab and the throttle body plate, the gap being large enough to permit the rotation of the throttle body plate within the bore.

19. The method of claim 16, wherein the commanding movement of the tab includes actuating a stepper motor to retract the tab into the throttle body housing to disengage the throttle body plate.

20. The method of claim 16, wherein the commanding movement of the tab includes actuating a stepper motor to release the tab from the throttle body housing to directly engage the throttle body plate.

* * * * *